(12) United States Patent
Man et al.

(10) Patent No.: US 7,152,693 B2
(45) Date of Patent: Dec. 26, 2006

(54) PASSWORD SECURITY UTILITY

(75) Inventors: Kwai Hing Man, Fremont, CA (US);
Gerald Edward Kozina, Cupertino, CA (US); Shirley S. Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 10/449,382

(22) Filed: May 30, 2003

(65) Prior Publication Data

US 2004/0240670 A1 Dec. 2, 2004

(51) Int. Cl.
*H04L 9/00* (2006.01)
(52) U.S. Cl. .................. 173/183; 713/182; 380/277; 380/44
(58) Field of Classification Search ............. 713/168, 713/181–183, 189, 193; 380/44, 46, 277, 380/281, 284, 286; 726/2–6, 16–18, 21, 726/27–30
See application file for complete search history.

(56) References Cited

U.S. PATENT DOCUMENTS

| | | | | |
|---|---|---|---|---|
| 5,734,718 A | * | 3/1998 | Prafullchandra | ............ 713/183 |
| 5,757,920 A | * | 5/1998 | Misra et al. | ................. 713/158 |
| 5,991,406 A | * | 11/1999 | Lipner et al. | ................ 380/286 |
| 2001/0033656 A1 | | 10/2001 | Gligor et al. | |
| 2002/0048364 A1 | | 4/2002 | Gligor et al. | |

FOREIGN PATENT DOCUMENTS

| WO | WO 01/56221 A2 | 8/2001 |
|---|---|---|
| WO | WO 01/56221 A3 | 8/2001 |
| WO | WO 02/17554 A2 | 2/2002 |

* cited by examiner

*Primary Examiner*—Hosuk Song
(74) *Attorney, Agent, or Firm*—Fay, Sharpe, Fagan, Minnich & McKee, LLP

(57) ABSTRACT

A resource manager (14, 16) of a content management system (10) is configured to receive a client request (34, 36) pertaining to information and to access at least one of a plurality of data servers (20, 22, 24, 26) to execute the client request (34, 36). An encryption engine (80) encrypts passwords associated with the plurality of data servers (20, 22, 24, 26) using a key-based encryption algorithm and stores a ciphertext corresponding to each password in a passwords storage (40). A server identifier module (70, 72) identifies a ciphertext in the passwords storage (40) that is associated with the at least one of a plurality of data servers (20, 22, 24, 26). A decryption engine (100) decrypts the ciphertext using a key-based decryption algorithm corresponding to the key-based encryption algorithm.

20 Claims, 5 Drawing Sheets

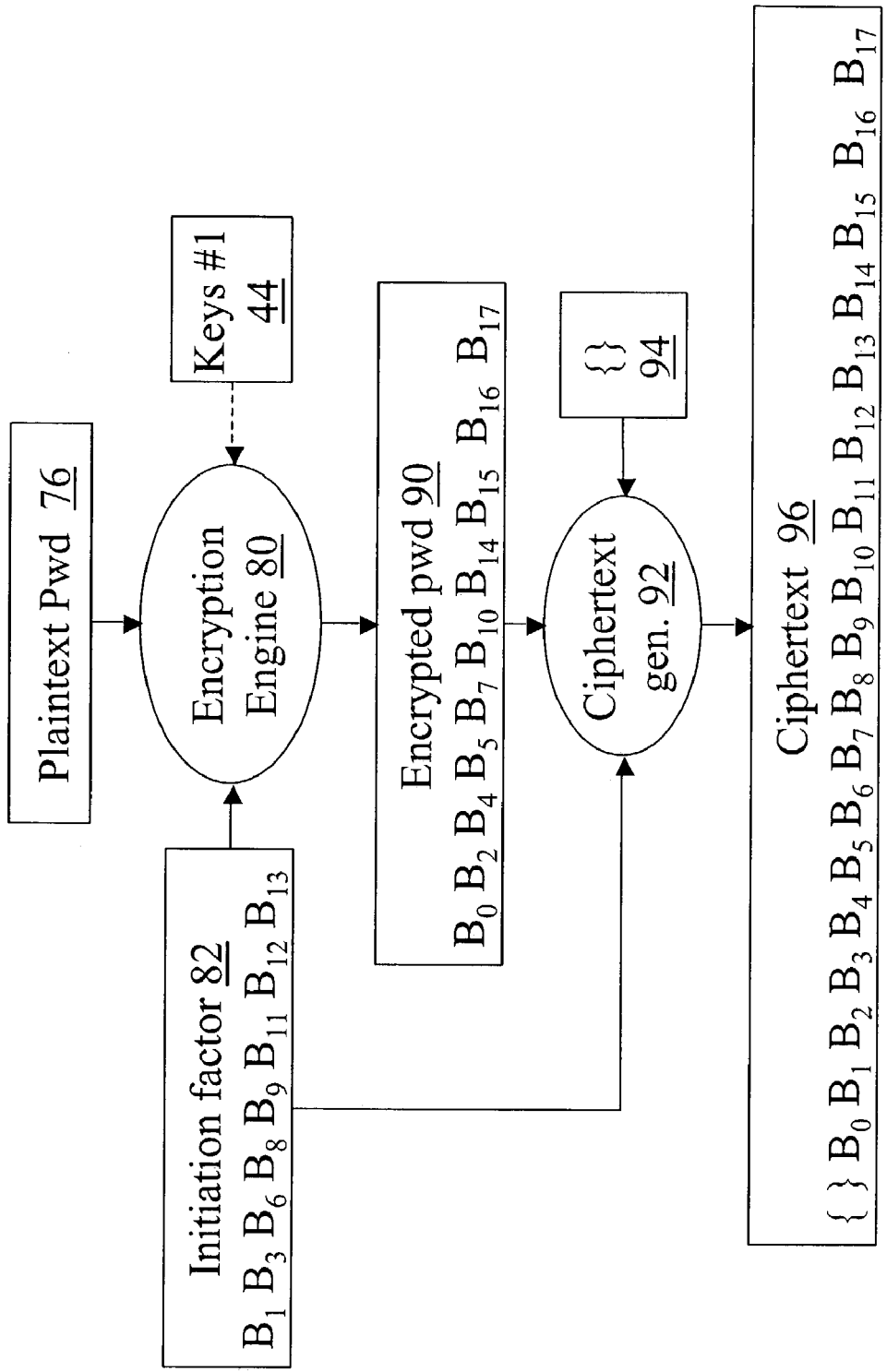

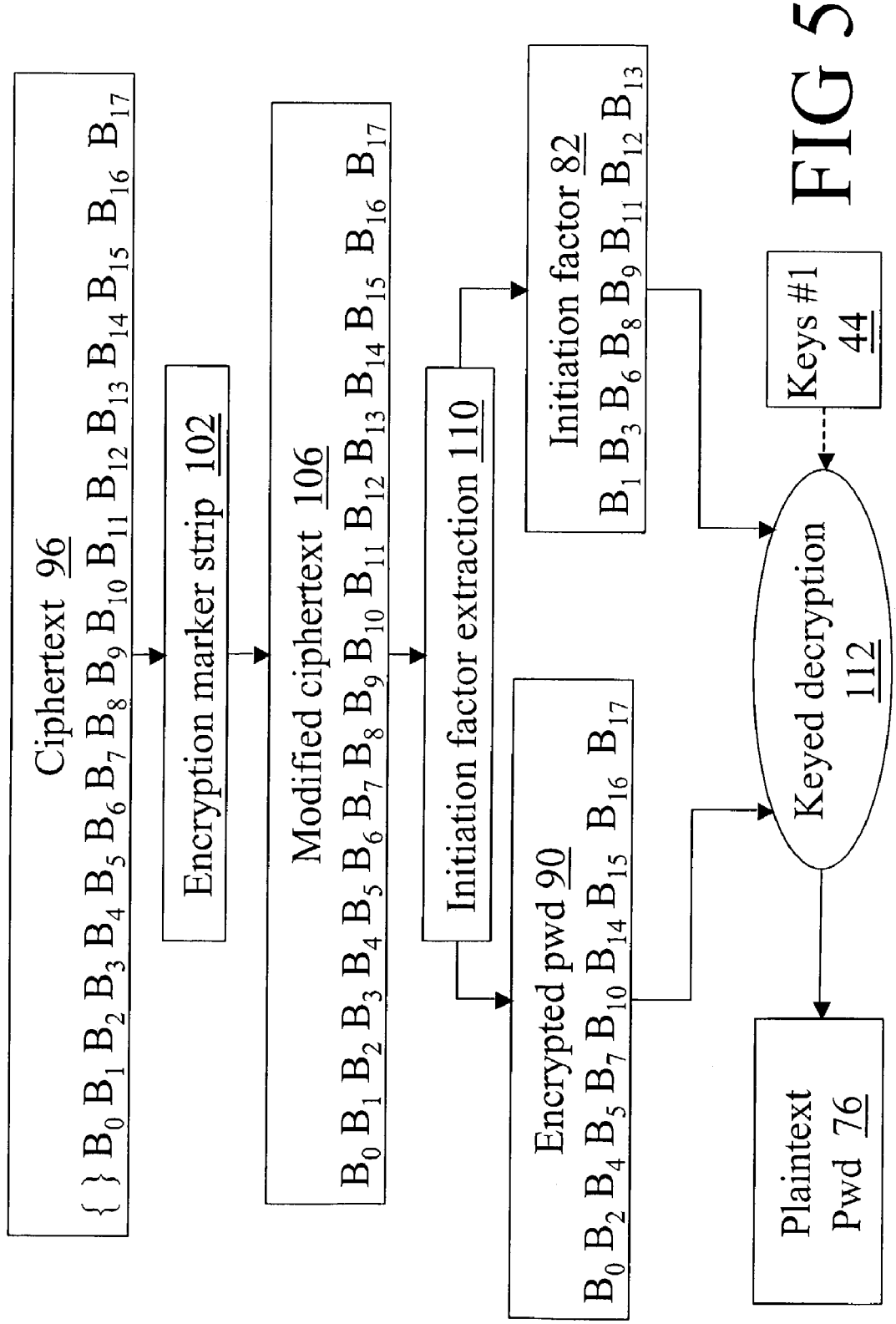

PASSWORD SECURITY UTILITY

BACKGROUND OF THE INVENTION

1. Field of the Invention

The present invention relates to the art of information security. It finds particular application in content management systems that perform secure access to a plurality of relational databases and other servers, and will be described with particular reference thereto. However, the present invention is useful in many other applications that involve password-secured access to computers and other digital systems and digital networks.

2. Description of Related Art

In large corporate data storage systems, typically only about fifteen percent of the data are stored in traditional database formats that are managed by conventional relational database management systems. The remaining eighty-five percent of the data are stored in a wide variety of less structured formats, such as image files, sound files, video files, text documents, electronic mail correspondence, spreadsheets, word processing documents, and the like. The lack of uniformity and absence of a common highly structured data format makes it difficult for end users to integrate and make use of such a diversity of data sources.

Content management systems have been developed to address these difficulties. A content management system provides a common, searchable user interface for accessing data servers including conventional relational databases and various other less structured sources of data. In a typical configuration, a content management system includes a library or otherwise-named searchable metadata-based content index, and one or more resource managers, object servers, or otherwise-named data interfaces that manage storage, archiving, retrieval, and delivery of the various types of information content. Resource managers provide a common interface for requesting and delivering content independent of its storage format and physical location.

To perform their functions, resource managers should have ready access to various relational database servers and other types of servers that contain the information to be indexed, stored, maintained, retrieved, delivered, or otherwise processed. Each of these servers is typically password-protected to control and limit access thereto. The passwords for the various servers are preferably different, but may be the same. To provide ready access to the various servers, the resource manager maintains a passwords list in a properties file, a database table, or other suitable data structure associated with the resource manager.

The convenience of providing a common resource manager interface for various servers comes at the cost of introducing a potential security risk in the form of the stored list of passwords. An unauthorized person such as a hacker who accesses the passwords list can attack any of the corresponding servers using the information derived from the list. To make unauthorized access of information more difficult, it is known to store in the passwords list in an encrypted form. The resource manager recalls an encrypted password, decrypts it, and forwards the decrypted plaintext password to the corresponding server to obtain access thereto.

Even with the use of encryption, however, the list of passwords continues to present some security risk. Insofar as resource managers are typically substantially standardized commercial software products, there is a possibility that knowledge of the cipher key at one resource manager installation can be used to illicitly access other resource manager installations. Moreover, because the passwords for the various servers are encoded using the same cipher key, a hacker or other unauthorized person who obtains the key or breaks the cipher has immediate access to all servers whose passwords are stored in the passwords list of the resource manager.

Even if the hacker does not steal or break the cipher key, the passwords list can still facilitate illicit server access. Although it is highly recommended to assign a different password to each server, in practice the same password is often assigned to more than one server. These identical passwords are converted into identical ciphertexts by the encryption. Persons who know the plaintext password for accessing one of these identically password-protected servers can scan the encrypted passwords list and immediately recognize other servers having the same password by identifying other servers with the same ciphertext password. Thus, even without breaking the cipher, such a person can gain access to those other identically password-protected servers, even though that person may not have authorization to access those other servers.

Yet another concern arises during updating of a password. While the resource manager is running, a new server connection may be added, or a password for an existing server connection may be changed. Password updating may be performed through one of the resource managers, or by accessing the server independently from the content management system. Typically, such a password update results in an unencrypted plaintext version of the password being added to the passwords list. Storage of the password in plaintext is an inherent security risk. Moreover, during a subsequent request to access that server, the resource manager accesses the stored plaintext password and attempts to decrypt it. Since the plaintext password is not encrypted, this results in a decryption error.

The present invention contemplates an improved method and apparatus which overcomes these limitations and others.

SUMMARY OF THE INVENTION

In accordance with one aspect of the invention, a resource manager is provided for use in an associated content management system. The resource manager is configured to receive a client request pertaining to information and to access at least one of a plurality of data servers to execute the client request. An encryption engine is adapted to encrypt passwords associated with the plurality of data servers using a key-based encryption algorithm and to store in a password storage a ciphertext corresponding to each password. The ciphertext is generated based at least on the encrypted password. A server identifier module identifies a ciphertext in the passwords storage that is associated with the at least one of a plurality of data servers. A decryption engine decrypts the ciphertext using a key-based decryption algorithm corresponding to the key-based encryption algorithm to recover the password corresponding to the ciphertext.

In accordance with another aspect of the invention, a content management method is provided for managing content stored on a plurality of data servers. A first cipher key set is computed comprising one or more random cipher keys associated with a first application of the method. A first plurality of passwords corresponding to a first plurality of servers is encrypted using the first cipher key set to produce ciphertexts corresponding to the passwords. The ciphertexts are stored in a first passwords list associated with the first application of the method. An information processing request is constructed based on user inputs. A server to be accessed during execution of the information processing request is identified. A ciphertext corresponding to the server to be accessed is retrieved from the first passwords list. The ciphertext corresponding to the server to be accessed is decrypted using the first cipher key set.

In accordance with yet another aspect of the invention, an article of manufacture is provided, including a program storage medium readable by a computer and embodying one or more instructions executable by the computer to perform a security utility method for maintaining a passwords list. A cipher key set is computed based on a generally variable quantity. Passwords are encrypted using the cipher key set. The encrypting of each password includes: generating a generally variable initialization factor corresponding to the password; encrypting the password based on the corresponding generally variable initialization factor and the cipher key set to produce an encrypted password; combining the encrypted password with at least the corresponding generally variable initialization factor to produce a ciphertext; and storing the ciphertext in the passwords list. Responsive to a request for one of the passwords, a ciphertext corresponding to the password is retrieved from the passwords list, the encrypted password and the corresponding variable initialization factor are recovered from the retrieved ciphertext, and the encrypted password is decrypted based on the corresponding variable initialization factor and the cipher key set to recover the password.

Numerous advantages and benefits of the invention will become apparent to those of ordinary skill in the art upon reading and understanding this specification.

BRIEF DESCRIPTION OF THE DRAWINGS

The invention may take form in various components and arrangements of components, and in various process operations and arrangements of process operations. The drawings are only for the purposes of illustrating preferred embodiments and are not to be construed as limiting the invention.

FIG. 4 is a schematic diagram showing a preferred system for generating a ciphertext corresponding to a password.

FIG. 5 is a schematic diagram showing a preferred system for recovering a password from a corresponding ciphertext.

DETAILED DESCRIPTION OF THE PREFERRED EMBODIMENTS

Figure 1:
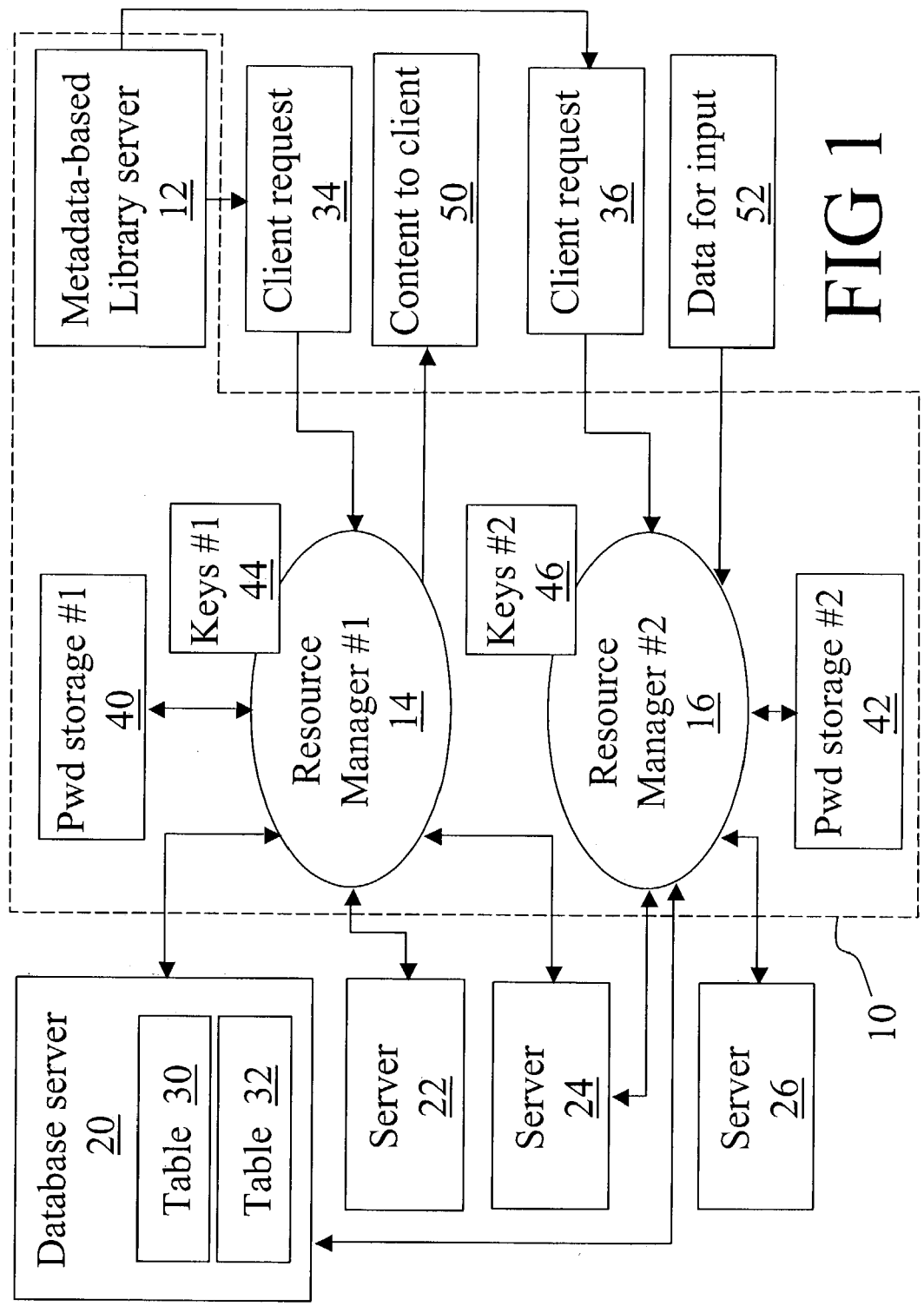
FIG. 1 is a schematic diagram showing a content management system including an exemplary two resource managers that access several exemplary servers.

With reference to FIG. 1, a content management system 10 includes a metadata-based library server or otherwise-named searchable metadata-based content index 12 and one or more resource managers, object servers, or otherwise-named data interfaces that manage storage, archiving, retrieval, and delivery of various types of information content. In FIG. 1, two exemplary resource managers 14, 16 provide a common interface for requesting and delivering information content independent of its storage format and physical location.

The information content is typically stored on various data servers, such as a relational database server 20 and other generic servers 22, 24, 26. It will be appreciated that in a typical corporate setting, the servers 20, 22, 24, 26 are not necessarily located together, but rather may be distributed regionally, nationally, or internationally. Moreover, each server 20, 22, 24, 26 can be embodied on a single computer or by a plurality of networked computers or other digital data processing or storage devices.

The relational database server 20 stores information in highly organized and accessible database tables such as database tables 30, 32. The other generic servers 22, 24, 26 may also be highly organized relational databases, or they may be less structured information repositories such as collections of image files, video content, audio content, text documents, word processing documents, spreadsheets, combined graphical-and-text presentations, electronic mail correspondence files, or the like. Such data is not highly organized, and is ordinarily not readily searched or selectively retrieved by end-users.

The content management system 10 provides a uniform and searchable interface for accessing data from the various servers 20, 22, 24, 26. The library server 12 contains metadata about the contents of the various servers 20, 22, 24, 26. For example, if the server 22 includes a folder or directory of image files, suitable metadata for each image file can include a server path, a textual content description, a set of search terms, a name of the person who created or inputted the file, a file creation date, file size, format, and other technical information, and the like. Similarly, suitable metadata for a word processing document can include a server path, a textual content description, a set of search terms, a document type (for example, letter, report, office memo, product manual, or so forth), a creator name, a creation date, a last-modified date, file size, and so forth.

End-users interact with the library server 12 to formulate information searches, to identify data for retrieval, to input data or metadata to one or more servers, or to otherwise manipulate contents of the various servers 20, 22, 24, 26. These interactions with the library server 12 cause the library server 12 to formulate one or more client requests, such as a first client request 34 for example requesting to retrieve selected information content, and a second client request 36 requesting to input information content to one or more of the servers. To execute the client requests 34, 36, one or more of the resource managers 14, 16 communicate with one or more of the servers 20, 22, 24, 26. In FIG. 1, the resource manager 14 communicates with the servers 20, 22, 24, while the resource manager 16 communicates with the servers 20, 24, 26. Although two resource managers 14, 16 are illustrated, the number of resource managers can be as few as one, or can be greater than two.

Moreover, as with the servers, the resource managers can be distributed regionally, nationally, or internationally, and can be embodied on a single computer, a network of computers, or other digital device or network. Those skilled in the art recognize that the resource managers 14, 16 and components thereof can be suitably embodied in various ways, such as in the form of an article of manufacture comprising a program storage medium readable by a computer and embodying one or more instructions executable by the computer to perform a series of process operations, or in the form of a computer program residing on a hard drive, optical disk, computer network server, or other digital data storage; or in the form of a method executing on a computer or other digital system; and so forth.

To limit access to the various servers 20, 22, 24, 26, each server is preferably password-protected. Preferably, each server 20, 22, 24, 26 is assigned a different password;

however, in practice the same password may be assigned to two or more of the servers 20, 22, 24, 26. To access the various servers, each resource manager 14, 16 has a passwords storage 40, 42 that contains the passwords for the various servers. In the illustrated embodiment, the resource manager 14 employs the passwords storage 40, while the resource manager 16 employs the passwords storage 42. The passwords storages 40, 42 can be embodied in substantially any type of digital data storage structure, such as database tables, properties files, or the like.

To provide security against unauthorized or illicit access, the passwords storages 40, 42 preferably store the passwords for the various servers 20, 22, 24, 26 in an encrypted form, that is, as ciphertext. Each resource manager 14, 16 includes an associated cipher key set 44, 46 for encoding the passwords. Thus, passwords in the passwords storage 40 are encrypted by the resource manager 14 using the cipher key set 44, while passwords in the passwords storage 42 are encrypted by the resource manager 16 using the cipher key set 46. Typically, each cipher key set 44, 46 includes a single key that is used for both encryption and decryption; however, it is also contemplated to employ a larger key set, such as separate but related encryption and decryption keys.

To execute the client request 34, the resource manager 14 retrieves the ciphertext corresponding to the one or more servers to be accessed during execution of the client request 34, decrypts the ciphertext to recover the plaintext password, and forwards the password to the corresponding server. After the server authorizes access based on the forwarded password, the resource manager 14 retrieves the requested information content, performs formatting the data as needed to convert the retrieved information into a content format comporting with user requirements, and forwards retrieved and formatted information content 50 to the end user directly or through the library server 12.

Similarly, to execute the client request 36, the resource manager 16 retrieves the ciphertext corresponding to the one or more servers to be accessed during execution of the client request 36, decrypts the ciphertext to recover the plaintext password, and forwards the password to the corresponding server. After the server authorizes access based on the forwarded password, the resource manager 16 forwards input data 52, after performing formatting as needed to convert the input data 52 into a format suitable for storage on the receiving server, and forwards the formatted input data to the server. Preferably, the library server 12 additionally creates and stores indexing metadata about the input data 52 to facilitate subsequent selective retrieval of the information content.

Two resource managers 14, 16 are illustrated in the embodiment shown in FIG. 1. For mass-produced, commercially available resource manager products, the installed resource managers are usually substantially standardized such that resource managers installed at various sites and even at different companies are substantially similar. In this arrangement, if the resource manager product uses a common cipher key then the cipher keys sets 44, 46 of the two resource managers 14, 16 will be identical to each other, and moreover the cipher keys sets 44, 46 will further be identical to those employed at other companies. This creates a substantial security risk.

Figure 2:
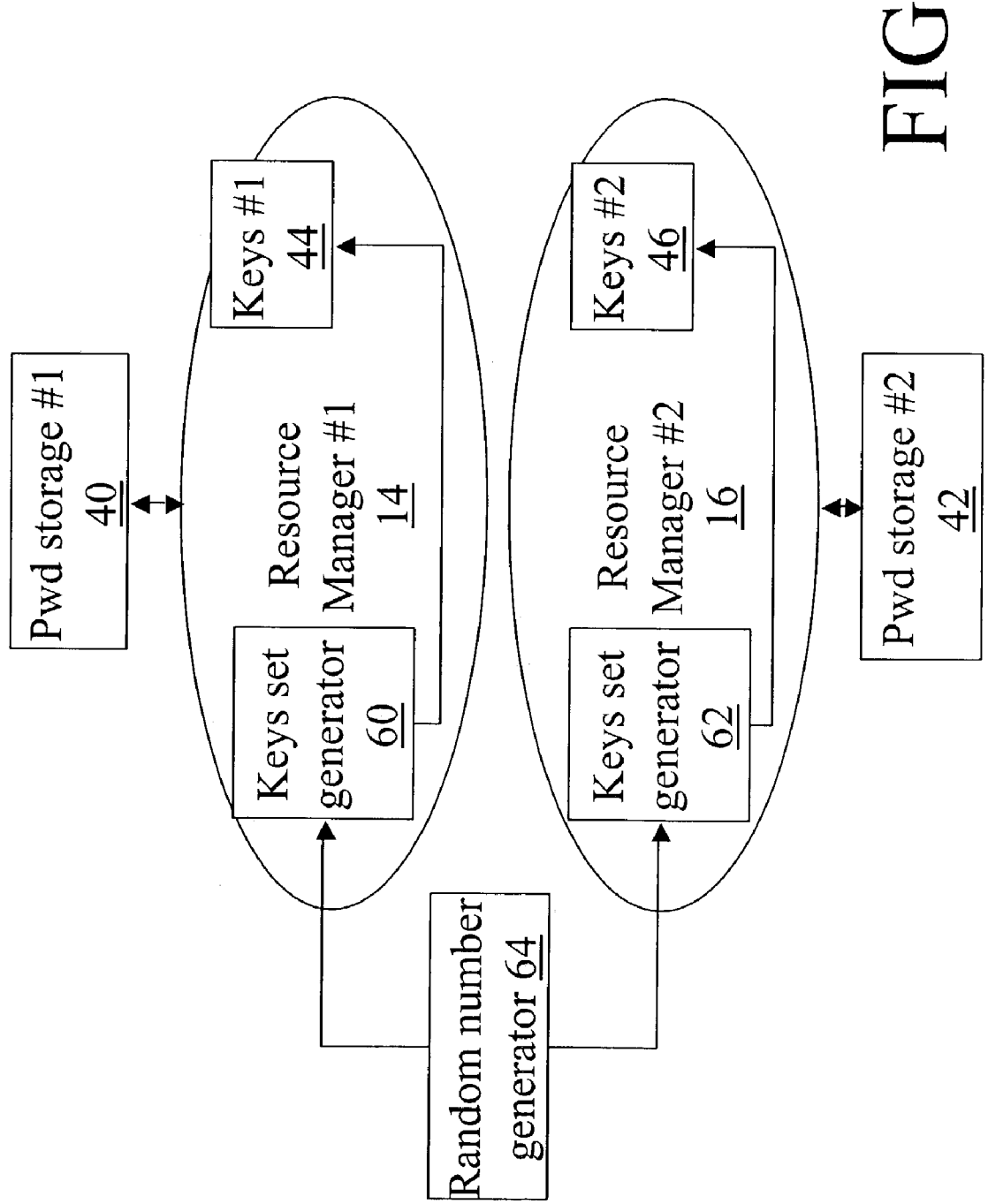
FIG. 2 is a schematic diagram showing components for generating a different cipher key set for each resource manager during its initialization time.

With reference to FIG. 2, therefore, in the preferred embodiment the cipher keys sets 44, 46 are different from one another and from other cipher key sets associated with other resource managers installations. The resource manager 14 includes a keys set generator 60 that creates the distinct key set 44 during its initialization time. Similarly, the resource manager 16 includes a keys set generator 62 that creates a distinct and generally different key set 46 during its initialization time. In this way, the cipher keys sets 44, 46 are different from one another and from other keys sets associated with other installed resource managers. The keys set generators 60, 62 access a random number generator 64 that provides a random or pseudorandom seed value for generating generally variable keys sets 44, 46 that vary and are distinct between different resource manager installations.

Figure 3:
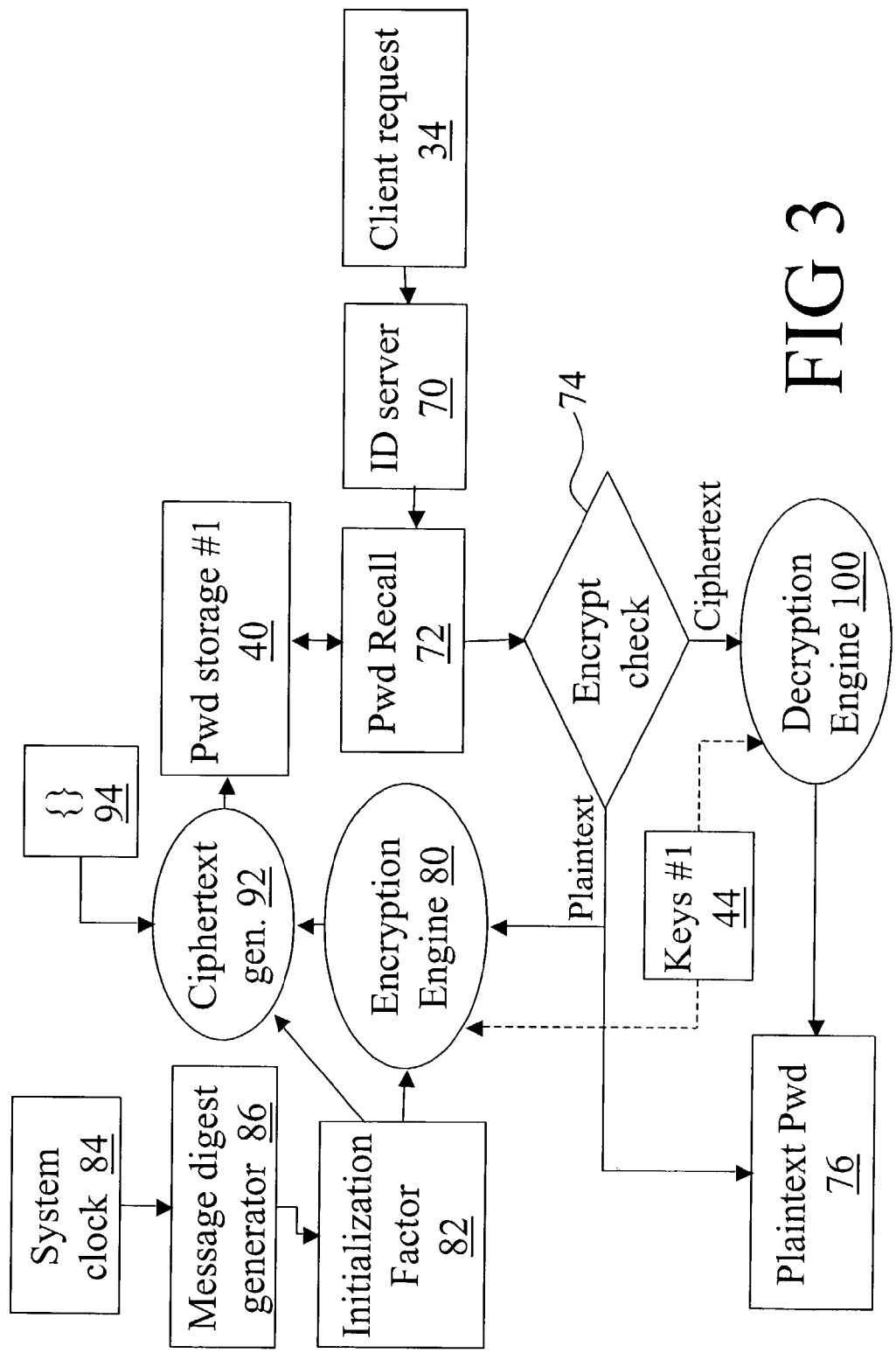
FIG. 3 is a schematic diagram showing a security utility component of one of the resource managers.

With reference to FIG. 3, a preferred embodiment of a security utility component of the resource manager 14 is described in more detail. In response to receiving the client request 34, a server identification module 70 identifies a server to be accessed in executing the client request 34. Since the client request 34 is a request to retrieve content, the server containing that content is identified. Alternatively, for the client request 36 requesting to input content, the server or servers to which that content is to be added is identified. A password recall module 72 retrieves the ciphertext corresponding to the password for the identified server from the passwords storage 40 that is associated with the resource manager 14.

Typically, the item retrieved from the passwords storage 40 is encrypted. However, in certain cases the plaintext password which is unencrypted is stored in the passwords storage 40. For example, the password for the particular server to be accessed may have been changed by a user via another resource manager or by direct access to the server at some time since the resource manager 14 last accessed the server. In this case, the updated plaintext password may have been loaded into the passwords storage 40. To account for this circumstance, the item retrieved by the password recall module 72 is first checked by an encryption verification processor 74 to determine whether the recalled item is a ciphertext or a plaintext version of the password.

With continuing reference to FIG. 3, if the encryption verification processor 74 finds that the recalled item is a plaintext password 76 rather than ciphertext, it forwards the plaintext password 76 to the server to provide authentication to enable access to the server. Additionally, the encryption verification processor 74 forwards the plaintext password 76 to an encryption engine 80 for encryption. The encryption engine 80 encrypts the password based on an encryption key of the cipher keys set 44, and preferably further based on a password-specific initialization factor 82. The initialization factor 82 is a generally variable quantity that is incorporated into the encryption process to make each password encryption unique. Even if two identical passwords are stored in the passwords storage 40, the ciphertext version of those identical passwords will be different because they will each be encoded using a different initialization factor 82.

As shown in FIG. 3, in a preferred embodiment the initialization factor 82 is computed from a system clock value 84 using a message digest generator 86. The message digest generator 86 employs a hash function to generate a message digest corresponding to a retrieved value of the system clock 84 that is retrieved at the time of encryption. A suitable hash function can produce very different message digest outputs even for very similar input values from the system clock. In a suitable approach, the first eight bytes of the message digest are used as the initialization factor 82. It is also contemplated to construct the initialization factor using other techniques for generating a generally varying values, such as constructing the initialization factor based on a pseudorandom value from the random number generator 64 (shown in FIG. 2).

The encryption engine 80 encrypts the plaintext password 76 using any suitable key-based encryption algorithm. The encryption key is preferably constructed by combining the encryption key of the cipher keys set 44 and the initialization factor 82. This ensures that each password is encrypted into a different ciphertext, even if two or more input passwords are identical. Since the initialization factor 82 for each encryption is computed using a different value of the system clock 84, the output of the encryption engine 80 is correspondingly different. Preferably, encryption is performed on a byte level so that the output is compatible with different character sets.

With continuing reference to FIG. 3, the encryption engine 80 outputs an encrypted password 90. Decryption of the encrypted password 90 requires knowledge of the initialization factor 82. In a preferred embodiment, a ciphertext generator 92 combines the encrypted password 90, the initialization factor 82, and with an encryption marker 94 in byte-wise fashion to generate a ciphertext 96 that is stored in the passwords storage 40.

With continued reference to FIG. 3 and with further reference to FIG. 4, a suitable byte-wise combination assigns the first two bytes of the ciphertext to storing the encryption marker 94, which in the illustrated embodiment is a two-byte sequence of open and close braces, that is, "{}". The passwords of the various servers are preferably not allowed to include braces, or are not allowed to include an open and close braces sequence, that is, "{}". Thus, the encryption verification processor 74 readily determines whether the item retrieved by the password recall module 72 is a plaintext password (which is not allowed to contain "{}") or is a ciphertext by checking whether the first type bytes are the encryption marker "{}". Of course, other types of encryption markers can be used. The encryption marker should be a byte value or sequence of byte values that are not allowed in passwords of the servers 20, 22, 24, 26.

Moreover, as shown in FIG. 4, the ciphertext 96 constructed by the combining performed by the ciphertext generator 92 includes the bytes of the initialization factor 82. These bytes are indicated in FIG. 4 as $B_1$, $B_3$, $B_6$, $B_8$, $B_9$, $B_{11}$, $B_{12}$, and $B_{13}$, that is, as the first, third, sixth, eighth, ninth, eleventh, twelfth, and thirteenth bytes following the encryption marker in the ciphertext 96. The remaining zeroeth, second, fourth, fifth, seventh, tenth, fourteenth, fifteenth, sixteenth, and seventeenth bytes following the encryption marker are used to store the encrypted password 90.

This illustrated combining, although preferred, is exemplary only, and other arrangements in which the byte values of the initialization factor 82 are interspersed in amongst byte values of the encrypted password 90 in the ciphertext 96 can be used. Moreover, rather than directly copying byte values of the initialization factor 82 into the allocated bytes of the ciphertext 96, other more complex techniques can be used for combining the initialization factor 82 and the encrypted password 90 into the ciphertext 96. Indeed, substantially any combining technique can be employed insofar as the technique allows the initialization factor 82 to be readily extracted from the combination during decryption.

Typically, the plaintext password 76 is a variable length password, that is, has a variable number of bytes. The corresponding encrypted password 90 is therefore also of variable length for most encryption algorithms. On the other hand, the exemplary initialization factor 82 has a fixed length of eight bytes. Hence, in a suitable general approach, predetermined bytes of the ciphertext 96 are allocated for storing byte values of the initialization factor 82 (in the exemplary embodiment illustrated in FIG. 4, these allocated bytes of the ciphertext 96 are the first, third, sixth, eighth, ninth, eleventh, twelfth, and thirteenth bytes following the encryption marker 94), and the unallocated bytes of the ciphertext 96 are used filled in with byte values of the encrypted password 90. Since the encrypted password 90 is generally of variable length, the ciphertext 96 also is of variable length.

With particular reference again to FIG. 3, if the encryption verification processor 74 finds that the item recalled by the password recall module 72 is encrypted (as indicated by the first two bytes of the recalled item corresponding to the encryption marker 94) then the recalled item is recognized as ciphertext. The recalled ciphertext is input to a decryption engine 100 which recovers the plaintext password 76 therefrom. The recovered plaintext password 76 is submitted to the server to be accessed to provide authentication.

With reference to FIG. 5, a suitable approach implemented by the decryption engine 100 for recovery of the plaintext password 76 is described. An encryption marker stripping processor 102 removes the encryption marker 94, that is, the leading two-byte sequence "{}", from the ciphertext 96 to produce modified ciphertext 106. An initialization factor extraction processor 110 recovers from the modified ciphertext 106 the initialization factor 82 (corresponding to the first, third, sixth, eighth, ninth, eleventh, twelfth, and thirteenth bytes of the modified ciphertext 106 in the illustrated embodiment) and the encrypted password 90 (corresponding to bytes other than the first, third, sixth, eighth, ninth, eleventh, twelfth, and thirteenth bytes of the modified ciphertext 106 in the illustrated embodiment).

A keyed decryption algorithm processor 112 decrypts the encrypted password 90 using a decryption key constructed from a decryption key of the cipher keys set 44 and the recovered initialization factor 82. In typical keyed encryption/decryption algorithms, the same key is used for both encryption and decryption. That is, the decryption key of the cipher keys set 44 is identical to the encryption key of the cipher keys set 44. The decryption processor 112 decrypts the encrypted password 90 using the generated decryption key to recover the plaintext password 76.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A resource manager for use in an associated content management system, the resource manager configured to receive a client request pertaining to information and to access at least one of a plurality of data servers to execute the client request, the resource manager including:

a encryption engine adapted to encrypt passwords associated with the plurality of data servers using a key-based encryption algorithm and to store in a password storage a ciphertext corresponding to each password, the ciphertext being generated based at least on the encrypted password;

a server identifier module that identifies a ciphertext in the passwords storage that is associated with the at least one of a plurality of data servers; and a decryption engine that decrypts the ciphertext using a key-based decryption algorithm corresponding to the key-based encryption algorithm to recover the password corresponding to the ciphertext.

2. The resource manager as set forth in claim 1, wherein the key-based encryption and decryption algorithms include a randomly generated encryption key associated with the resource manager.

3. The resource manager as set forth in claim 1, further including:
an initialization factor generator module that computes an initialization factor based on a randomizing input, the encryption engine being adapted to access the initialization factor generator module to obtain a different initialization factor for encrypting each password, the key-based encryption algorithm computing for each password an encrypted password based on the corresponding initialization factor and an encryption key.

4. The resource manager as set forth in claim 3, further including:
a message digest generator that computes a message digest based on a system clock value, the message digest being the randomizing input to the initialization factor generator module.

5. The resource manager as set forth in claim 4, wherein:
the encryption engine generates the ciphertext by combining at least the initialization factor and the encrypted password, the generating of the ciphertext including:
assigning values of bytes of the initialization factor to selected bytes of the ciphertext; and
assigning values of bytes of the encrypted password to bytes of the ciphertext other than the selected bytes.

6. The resource manager as set forth in claim 3, wherein:
the encryption engine generates the ciphertext by combining at least the initialization factor with the corresponding encrypted password.

7. The resource manager as set forth in claim 3, wherein the encryption engine generates the ciphertext by interspersing bytes of the initialization factor with bytes of the corresponding encrypted password.

8. The resource manager as set forth in claim 6, wherein:
the decryption engine decrypts the ciphertext by extracting the initialization factor from the corresponding ciphertext, the key-based decryption algorithm computing the password based on the ciphertext, the extracted initialization factor, and a key corresponding to the encryption key.

9. The resource manager as set forth in claim 8, wherein the key corresponding to the encryption key is the encryption key.

10. The resource manager as set forth in claim 1, wherein:
the key-based encryption algorithm and the key-based decryption algorithm perform encryption and decryption, respectively, at a byte level.

11. The resource manager as set forth in claim 10, wherein:
the encryption engine is adapted to encrypt each password to define an encrypted password and combines the encrypted password with one or more encryption marker bytes that are distinguishable from bytes of the passwords associated with the plurality of data servers.

12. The resource manager as set forth in claim 11, wherein:
the decryption engine performs the decrypting conditional upon the ciphertext including the one or more encryption marker bytes.

13. A content management method for managing content stored on a plurality of data servers, the content management method including:
computing a first cipher key set comprising one or more random cipher keys associated with a first application of the method;
encrypting a first plurality of passwords corresponding to a first plurality of servers using the first cipher key set to produce ciphertexts corresponding to the passwords, the ciphertexts being stored in a first passwords list associated with the first application of the method;
constructing an information processing request based on user inputs;
identifying a server to be accessed during execution of the information processing request;
retrieving a ciphertext corresponding to the server to be accessed from the first passwords list; and
decrypting the ciphertext corresponding to the server to be accessed using the first cipher key set.

14. The content management method as set forth in claim 13, further including:
computing a second cipher key set comprising one or more random cipher keys associated with a second application of the method, the second cipher key set being different from the first cipher key set; and
encrypting a second plurality of passwords corresponding to a second plurality of servers using the second cipher key set to produce ciphertexts corresponding to the passwords, the ciphertexts being stored in a second passwords list associated with the second application of the method.

15. The content management method as set forth in claim 13, wherein the encrypting of the first plurality of passwords to produce ciphertexts corresponding to the passwords includes for each password:
generating a randomizing factor;
encrypting the password based on the first cipher key set and the randomizing factor to produce an encrypted password; and
combining the encrypted password and the randomizing factor to produce the ciphertext.

16. The content management method as set forth in claim 13, wherein the encrypting of the first plurality of passwords to produce ciphertexts corresponding to the passwords includes:
for each password, computing a message digest having a preselected number of bytes based on a system clock value retrieved during the encrypting of that password, the encrypting being performed based on the cipher key set and the computed message digest, wherein the encrypting of each password employs a message digest computed from a different system clock value.

17. An article of manufacture comprising a program storage medium readable by a computer and embodying one or more instructions executable by the computer to perform a security utility method for maintaining a passwords list, the method comprising:
computing a cipher key set based on a generally variable quantity;
encrypting passwords using the cipher key set, the encrypting of each password including:
generating a generally variable initialization factor corresponding to the password,
encrypting the password based on the corresponding generally variable initialization factor and the cipher key set to produce an encrypted password,
combining the encrypted password with at least the corresponding generally variable initialization factor to produce a ciphertext, and
storing the ciphertext in the passwords list; and responsive to a request for one of the passwords:
retrieving a ciphertext corresponding to the password from the passwords list,
recovering the encrypted password and the corresponding variable initialization factor from the retrieved ciphertext, and
decrypting the encrypted password based on the corresponding variable initialization factor and the cipher key set to recover the password.

18. The article of manufacture as set forth in claim 17, wherein the computing of a cipher key set based on a generally variable quantity includes:
retrieving a random value from a random number generator; and
computing the cipher key set based on the retrieved random value.

19. The article of manufacture as set forth in claim 17, wherein the generating of a generally variable initialization factor corresponding to the password includes:

retrieving a system clock value; and
computing a message digest corresponding to the retrieved system clock value.

20. The article of manufacture as set forth in claim 17, wherein:
the combining the encrypted password with at least the corresponding generally variable initialization factor to produce a ciphertext further includes incorporating an encryption marker into the ciphertext, the encryption marker being distinct from the passwords; and
the recovering of the encrypted password and the corresponding variable initialization factor from the retrieved ciphertext and the decrypting of the encrypted password are performed conditional upon the ciphertext incorporating the encryption marker.

* * * * *